(12) United States Patent
Lo

(10) Patent No.: US 7,099,498 B2
(45) Date of Patent: Aug. 29, 2006

(54) MINUTIAE MATCHING SYSTEM AND METHOD

(75) Inventor: Peter Zhen-Ping Lo, Lake Forest, CA (US)

(73) Assignee: Motorola, Inc., Schaumburg, IL (US)

( * ) Notice: Subject to any disclaimer, the term of this patent is extended or adjusted under 35 U.S.C. 154(b) by 711 days.

(21) Appl. No.: 10/261,790

(22) Filed: Sep. 30, 2002

(65) Prior Publication Data

US 2004/0062428 A1    Apr. 1, 2004

(51) Int. Cl.
G06K 9/00 (2006.01)
(52) U.S. Cl. .................................. 382/125; 382/124
(58) Field of Classification Search ................ 382/125, 382/124
See application file for complete search history.

(56) References Cited

U.S. PATENT DOCUMENTS

| | | | |
|---|---|---|---|
| 3,699,519 A | 10/1972 | Campbell | |
| 4,135,147 A | 1/1979 | Riganati et al. | |
| 4,225,850 A | 9/1980 | Chang et al. | |
| 4,646,352 A | 2/1987 | Asai et al. | |
| 4,817,183 A | 3/1989 | Sparrow | |
| 4,876,726 A | 10/1989 | Capello et al. | |
| 5,613,014 A | 3/1997 | Eshera et al. | |
| 5,625,448 A | 4/1997 | Ranalli et al. | |
| 5,659,626 A | 8/1997 | Ort et al. | |
| 5,960,101 A | 9/1999 | Lo et al. | |
| 6,125,192 A | 9/2000 | Bjorn et al. | |
| 6,289,112 B1 | 9/2001 | Jain et al. | |
| 6,546,122 B1 * | 4/2003 | Russo | 382/125 |

OTHER PUBLICATIONS

A real-time matching system for large fingerprint databases, Ratha, N.K.; Karu, K.; Shaoyun Chen; Jain, A.K.; Pattern Analysis and Machine Intelligence, IEEE Transactions on vol. 18, Issue 8, Aug. 1996 pp. 799-813, Digital Object Identifier.*

B. M. Mahtre, "Segmentation of Fingerprint Images Using the Directional Image". Pattern Recognition, vol. 20, No. 4, Pergamon Journals Ltd., 1987, Pattern Recognition Society, Great Britain, pp. 429-435.

* cited by examiner

*Primary Examiner*—Joseph Mancuso
*Assistant Examiner*—Hadi Akhavannik
(74) *Attorney, Agent, or Firm*—A. Kate Huffman; Valerie M. Davis

(57) ABSTRACT

A system and a method for minutiae record matching is claimed that includes the processing a first plurality of ordered minutiae match values with weighting values corresponding to a function of at least the number of minutiae in the corresponding latent print and the corresponding print in the tenprint for a given unweighted match value to define a second plurality of weighted match values. The second plurality of weighted match values may be further normalized based at least on the highest unweighted match value to generated a third plurality of weighted match values.

17 Claims, 2 Drawing Sheets

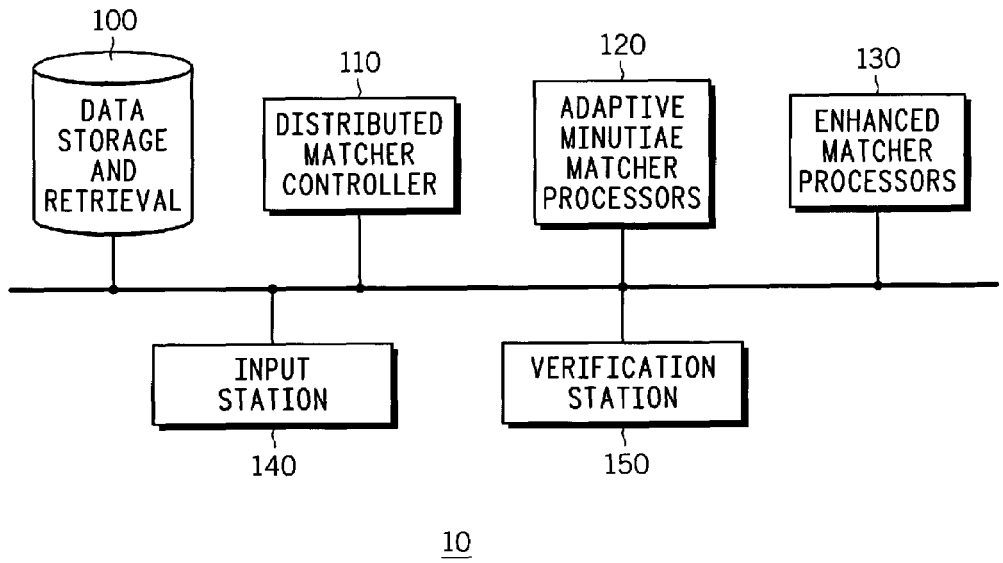
FIG. 1
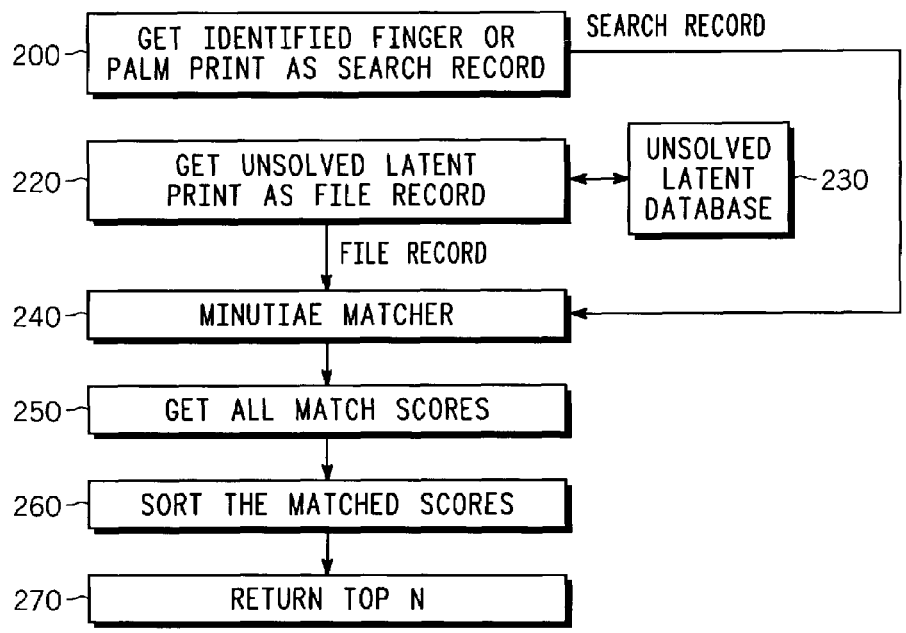
FIG. 2 -PRIOR ART-

MINUTIAE MATCHING SYSTEM AND METHOD

FIELD OF INVENTION

This invention relates generally to pattern identification systems, and more particularly to a system and method of matching minutiae patterns of a set of prints to another set of prints.

BACKGROUND

Identification pattern systems, such as fingerprinting systems, play a critical role in modern society in providing public safety, such as for criminal identification, and in civil applications such as credit card or personal identity fraud. The accuracy of matching one set of records to a second set of files quickly has become integral to a safe and efficient society.

Modern automatic fingerprint identification systems (AFIS) may perform several hundred thousand to a few million comparisons of prints, including fingerprints and palm prints, per second. In a typical search scenario a print (referred to typically as a search record) may be compared against millions of prints (typically referred to as file records) that are stored in the database of the identification systems. In these identification systems, a matching algorithm produces a list of the file record candidates that are the closest to the search records based on minutiae characteristics. Examples of such systems are described in U.S. Pat. No. 5,960,101; U.S. Pat. No. 4,135,147; and U.S. Pat. No. 6,125,192.

Matching accuracy with instant speed is imperative to provide useful data for the many identification applications. Often a latent print, such as one left at a crime scene, is partially obscured, smudged, or contains background noise that may decrease the accuracy of matching the minutiae of the latent print to reference files. Thus, more matched records must be subsequently hand searched by a latent examiner to provide the accurate information required. In exchange for accuracy, however, the process is slower and more laborious.

To improve accuracy, designers have focused on obtaining better latent and reference prints, organizing data in databases to better match prints such as using orientation and zoom features, and designing systems that are more robust. However, enhancing substantial accuracy with speed remains a goal in this area. Thus, it would be desirable to have an improved matching minutiae system and method that achieves substantially increased accuracy without sacrificing speed in the identification process.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

FIG. 1 is a schematic drawing of a hardware system including the minutiae matching system in accordance with an exemplary embodiment of the present invention;

FIG. 2 is a flow diagram illustrating a matched minutiae system in accordance with the prior art;

Figure 3:
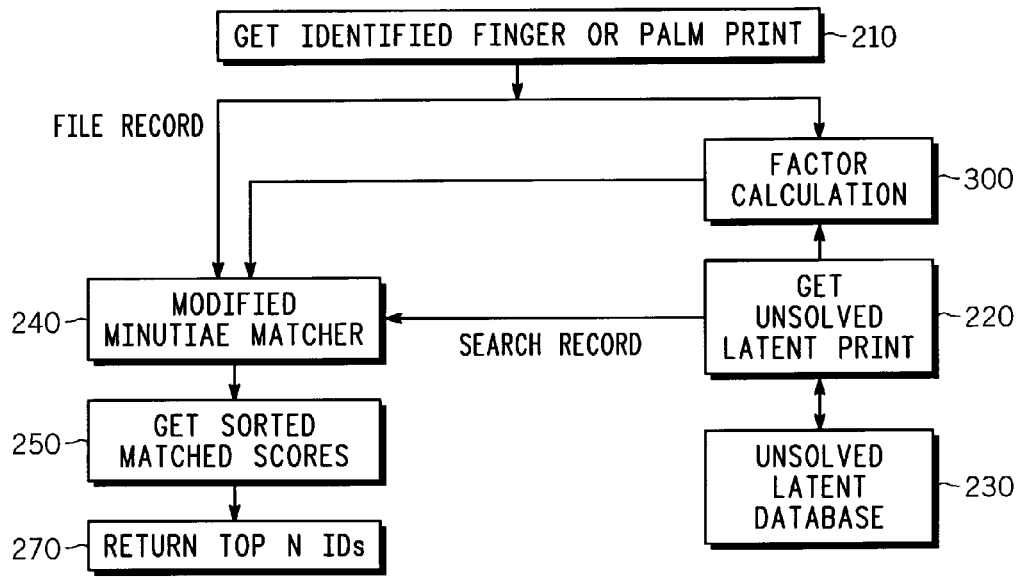
FIG. 3 is a flow diagram illustrating the improved matched minutiae system in accordance with a representative aspect of the present invention.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

The following descriptions are of exemplary embodiments of the invention and the inventor's conception of the best mode and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

FIG. 1 illustrates a minutiae matching processing system 10 that may be used to incorporate the inventive system and is described in more detail in U.S. Pat. No. 5,960,101, herein incorporated by reference. The system 10 includes a data storage and retrieval system 100 that stores and retrieves minutiae images of prints, including fingerprints and palm prints. In a representatively preferred embodiment, the prints may be scanned using a commercially available scanner and subsequently processing the images before storing in the system 100.

The system 10 also includes a distributed matcher controller 110 and an adaptive minutiae matching processor 120 which perform an initial match of a first print set to a second print set. The inventive system is loaded into the processor 120 in the preferred embodiment. Flow diagrams of embodiments of the inventive system is illustrated in detail in FIGS. 3 and 4.

The records may be processed from unsolved latent prints, ten print fingerprints or palm prints, etc. An unsolved latent print is typically defined as a finger or palm print lifted from a crime scene or unknown source whose owner is unknown. A ten print fingerprint is generally referenced to as a set of 10 fingerprints that may have been taken from a person by either the rolled or flat method of capturing the prints in a media. Typically, the ten print fingerprints are processed to produce search records against which a file record processed from a latent print is compared. It is understood that ten prints may include toe or palm prints as well.

The minutiae matching system 10 also includes an enhanced matcher processor 130 which may be based on any one of a number of available computer systems, such as a personal computer or Unix computer system manufactured by Hewlett Packard Compaq Corporation.

The minutiae matching system 10 may optionally include a number of workstations, such as an input station 140 and a verification station 150. The above systems are well known in the art and currently available from Printrak International, a Motorola company.

FIG. 2 illustrates a flow diagram of a prior art method of matching minutiae. In block 200, identified finger or palm prints (or both) are captured. The prints may be scanned live (i.e. directly from a person's fingers or palm placed on a scanner) or may be scanned from a print card. Each print contains minutiae which have respective X-Y coordinate positions and angles of orientation as described in detail in U.S. Pat. No. 5,960,101 herein incorporated by reference. Individual captured minutiae of each print form what is termed a "search record." A search record may be referred to as a "reference print" as well.

Block 220 illustrates the step of capturing unsolved latent prints from, for example, as crime scene. The latent prints may be scanned from the captured media and the individual minutiae with their respective X-Y coordinate positions and angles of orientation are categorized and stored. Individual captured minutiae of each unsolved latent print form what is termed a "file record."

The individual minutiae data of the file record are stored in the database. The minutiae of the search and file records are compared in a minutiae matcher microprocessor 240. In particular, the X-Y coordinates and the angles of orientation of minutiae in the search and file records are compared to determine which prints are possible matches and match scores are assigned as illustrated in Block 250. Then, a down-selection process takes place where the matching operation produces an ordered or sorted list of possible sets of matching prints for further evaluation as shown in Block 260. A list of mated minutiae for each set of records is produced and a preferred N number of records having scores above an assigned level are returned to an examiner as illustrated in Block 270.

Minutia on a search record is termed as "mated" if there is corresponding minutia on the file record, or if there is a corresponding minutia that falls on or near the minutiae on the file record. Other known print matching techniques may also be used in which the focus is on matching a file record individual minutiae, as well as features in the immediate vicinity of the file record individual minutiae, with corresponding search record individual minutiae, as well as features in the immediate vicinity of the individual print minutiae as described in the U.S. Pat. No. 5,960,101 patent, herein incorporated by reference.

In the enhanced minutiae matcher embodiment illustrated in FIG. 3, a file record is processed from an identified print in block 210. A search record is also processed by retrieving an unsolved latent print from an unsolved latent database of block 230, as shown in block 220. Such records may be processed as described in U.S. Pat. No. 5,960,101, herein incorporated by reference.

According to the invention, the file record and/or the search records may be weighted as described below, individually or together, prior to a matching process performed in the modified minutiae matcher shown in block 240 or the records may be weighted as illustrated in block 300, individually or together with the matching process in the modified minutiae matcher of block 240. Once processed, the weighted and matched file and/or search records are sorted as shown in block 250 and an assigned number of matched scores are identified for review as shown in block 270.

Figure 4:
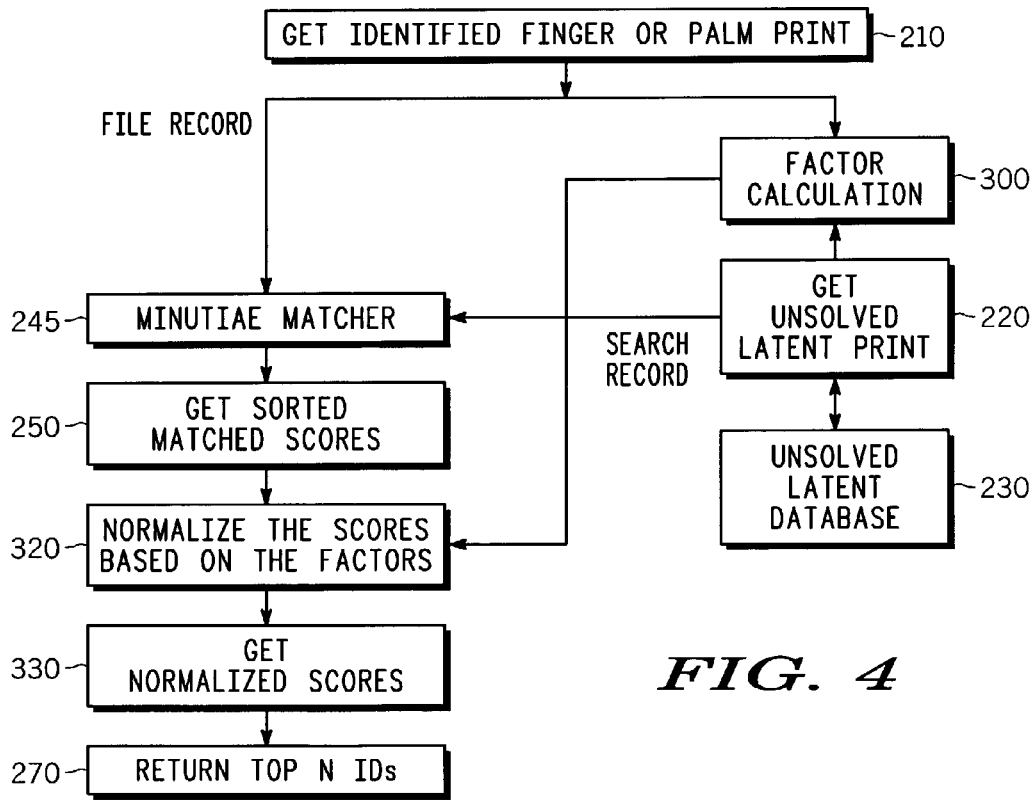
FIG. 4 is a flow diagram illustrating a preferred embodiment of the inventive matched minutiae in accordance with another exemplary embodiment of the present invention.

In another exemplary embodiment illustrated in FIG. 4, the file record of block 210 may be compared or matched to the search record processed from the unsolved latent print retrieved in block 220 from the unsolved latent database shown in block 230 in the minutiae matcher shown in block 240. The matched records are scored and sorted as shown in block 250 and the scores may be normalized as described below and shown in block 320. The normalized scores are retrieved in block 330 and provided to the examiner according to an assigned value N as shown in block 270.

In still another exemplary embodiment shown in FIG. 4, the file record is processed in the minutiae matcher of block 240 with the search record process in block 220 to provide matched scores to be sorted as shown in block 250. In addition the file record is weighted as shown in block 300 and subsequently normalized with the sorted matched scores as illustrated in block 320. The normalized scores are retrieved in block 330 and provided to the examiner according to an assigned value N as shown in block 270.

The weighting process illustrated in block 300 of FIGS. 3 and 4 is described as follows. Conventional minutiae match algorithms typically employ what is known in the art as a 'Forward Search' which generally matches two sets of minutiae features based on how similar they are as compared with each other. A matching score may be generated based on the number of minutiae pair matches and the closeness of each minutiae pair matched. Typically, the closeness of a match may be determined by evaluation of the planar Cartesian coordinates (e.g., scalar quantities) of minutiae features (i.e., terminations and bifurcations) and their instantaneous derivatives (e.g., vector quantities). The following expression, for example, may be used to illustrate how the forward search process may proceed:

$$\sum_{i=1}^{n} \hat{\mathbb{N}}\langle S \mid R_i \rangle = \mathbb{R}^{forward} = \sum_{i=1}^{n} M_i^{forward}$$

where n is the number of file records $R_i$ being searched, $\hat{\mathbb{N}}$ represents the minutiae match operator, S represents the search record, and $$\mathbb{R}^{forward} = \sum_{i=1}^{n} M_i^{forward}$$

corresponds to a plurality of minutiae match values for the 'forward search'.

Additionally, the search may be performed in the opposite direction by swapping the search print record for the file print record in accordance with, for example:

$$\sum_{i=1}^{n} \hat{\mathbb{N}}\langle R_i \mid S \rangle = \mathbb{R}^{reverse} = \sum_{i=1}^{n} M_i^{reverse}$$

where n is the number of file records $R_i$ being searched, $\hat{\mathbb{N}}$ represents the minutiae match operator, S represents the search record, and $$\mathbb{R}^{reverse} = \sum_{i=1}^{n} M_i^{reverse}$$

corresponds to a plurality of minutiae match values for the 'reverse search'. In general, the reverse search, that is the comparison of a file record (ten print) to a search record (unsolved latent print) tends to produce results demonstrating enhanced accuracy.

In accordance with one exemplary embodiment of the present invention, a weighting factor based at least on the number of minutiae comprising the latent print corresponding to each minutiae match record is used to scale the otherwise unweighted minutiae match values so as to differentiate those minutiae match values corresponding to larger or smaller aggregate numbers of matched minutiae features. The result is a novel scoring process that, at least in part, accounts for or otherwise addresses the minutiae number ratio $$\frac{L_n}{T_n}$$

of search to file prints, where $L_n$ generally corresponds to the number of minutiae present in the latent print search records, for example, of an unsolved latent print database (i.e., 'latent print' database) and $T_n$ generally corresponds to the number of minutiae present in a print taken from an individual i.e., a 'ten print', a 'palm print', and the like. Typically, the number of minutiae features present in a latent print will be less than or equal to the number of features available in a 'ten print' database. Accordingly, the minutiae number ratio may typically take on values in the range of $$0 < \frac{L_n}{T_n} < 1.$$

In one exemplary embodiment, in accordance with a representative aspect of the instant invention, a weighting operator $\hat{\Theta}$ may be defined as:

$$-\frac{M_i^3 \exp\left(\frac{L_n}{T_n}\right)}{CL_n^2},$$

where $M_i$ represents a minutiae match value (or match score) and C represents any non-zero constant. In one exemplary embodiment, this weighting operator may be approximated by at feast one of a series expansion, a Taylor expansion, an Euler expansion and an expansion of sines and cosines.

An exemplary application of a representative weighting operator $\hat{\Theta}$ so defined may be, for example:

$$\sum_{i=1}^{n} \hat{\Theta} S_i^{reverse} = \Box^\dagger$$

where $\Box^\dagger$ is observed to be about at least 10% improved over either $\Box^{forward}$ or $\Box^{reverse}$. In one exemplary embodiment, C=1 and each unweighted match value in the initial unweighted list of match values is modified by the weighting operator to generate a second weighted ordered list of match values. In another exemplary embodiment, the match values in the second ordered list are further normalized to the highest unweighted match value to generate a third ordered list of weighted match values. In accordance with this embodiment, the weighted match values in the second ordered list are each modified by the above-defined weighting operator $\hat{\Theta}$. However, in this case C comprises $$\left(M_i \frac{\max(\Box_{unweighted})}{\max(\Box_{weighted})}\right)^{-1},$$

where $M_i$ represents the match value, $\Box_{unweighted}$ represents a maximum unweighted match value from the initial list of unweighted match values, and $\Box_{weighted}$ represents a maximum weighted match value from the second list of weighted match values.

In other exemplary embodiments, any $$\hat{\Theta} \propto \left(\frac{L_n}{T_n}\right)$$

or $\hat{\Theta}=\hat{\Theta}(L_n, T_n)$ may be alternatively, conjunctively and/or sequentially employed to reproduced or otherwise generate a substantially similar result in accordance with the instant invention.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, matchable data structures, and the like, which may carry out a variety of functions under the control of one or more microprocessors or other control devices.

Similarly, the software elements of the present invention may be implemented with any programming or scripting language such as, for example, C, C++, Java, COBOL, assembler, PERL, eXtensible Markup Language (XML), etc., or any programming or scripting language now known or hereafter derived in the art, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

It will be appreciated, that many applications of the present invention could be formulated. One skilled in the art will appreciate that the network may include any system for exchanging data, such as, for example, the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, mini-computer, mainframe, or the like running any operating system such as any version of Windows, Windows XP, Windows Whistler, Windows ME, Windows NT, Windows2000, Windows 98, Windows 95, MacOS, OS/2, BeOS, Linux, UNIX, or any operating system now known or hereafter derived by those skilled in the art. Moreover, the invention may be readily implemented with TCP/IP communications protocols, IPX, Appletalk, IP-6, NetBIOS, OSI or any number of existing or future protocols. Moreover, the system contemplates the use, sale and/or distribution of any goods, services or information having similar functionality described herein.

The computing units may be connected with each other via a data communication network. The network may be a public network and assumed to be insecure and open to eavesdroppers. In one exemplary implementation, the network may be embodied as the internet. In this context, the computers may or may not be connected to the internet at all times. Specific information related to data traffic protocols, standards, and application software utilized in connection with the Internet may be obtained, for example, from DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference. A variety of conventional communications media and protocols may be used for data links, such as, for example, a connection to an Internet Service Provider (ISP) over the local loop as is typically used in connection with standard modem communication, cable modem, Dish networks, ISDN, Digital Subscriber Line (DSL), or various wireless communication methods. Polymorph code systems might also reside within a local area network (LAN) which interfaces to a network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

As will be appreciated by one of ordinary skill in the art, the present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by merely the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical". Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing or design parameters or other operating requirements without departing from the general principles of the same.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "set of instructions", as used herein, is defined as a sequence of instructions designed for execution on a microprocessor or computer system. A program or set of instructions may include a subroutine, a function, a procedure, an object method, an object implementation, an executable application, an applet, a servlet, a source code, an object code, a shared library/dynamic load library and/or other sequence of instructions designed for execution of a computer system.

I claim:

1. A method for matching a tenprint with a plurality of latent prints, comprising the steps of:

generating a set of search prints comprising a plurality of latent prints each having an unknown identity and each comprising a predetermined number of minutiae and a tenprint file print comprising a plurality of prints each having a known identity and each comprising a predetermined number of minutiae;

comparing the minutiae of the latent prints in the set of search prints to the minutiae of the prints in the tenprint;

generating a first ordered list of match scores based on the comparison, wherein each match score indicates how closely a given latent print in the set of search prints matches a given print in the tenprint; and generating a second ordered list of match scores by modifying each match score in the first ordered list based at least on the predetermined number of minutiae comprising the corresponding latent print.

2. The method for print matching according to claim 1, wherein the second ordered list is further generated by modifying each match score in the first ordered list based on the predetermined number of minutiae comprising the corresponding print in the tenprint.

3. The method for print matching according to claim 2, wherein the second ordered list is generated by modifying each match score in the first ordered list by a weighting factor that is based on the predetermined number of minutiae comprising the corresponding print in the tenprint and the predetermined number of minutiae comprising the corresponding latent print.

4. The method for print matching according to claim 1, wherein a print comprises one of a fingerprint, a toe print and a palm print.

5. The method for print matching according to of claim 1, wherein each of the latent prints in the set of search prints is stored in a separate search print record, the method further comprising the step of selecting at least one search print record based on the match scores in the second ordered list.

6. The method for print matching according to claim 3, wherein the weighting factor comprises a ratio of $$\frac{L_n}{T_n},$$

where $L_n$ represents the predetermined number of minutiae comprising the corresponding latent print $T_n$ represents the number of predetermined minutiae comprising the corresponding print in the tenprint.

7. The method for print matching according to claim 6, wherein the weighting factor comprises $$\frac{M_i^3 \exp\left(\frac{L_n}{T_n}\right)}{CL_n^2},$$

where $M_i$ represents a match score and C represents any non-zero constant.

8. The method for print matching according to claim 7, wherein C=1.

9. The method for print matching according to claim 8 further comprising the step of generating a third ordered list of match scores by modifying each match score in the second ordered list by a weighting factor comprising $$\frac{M_i^3 \exp\left(\frac{L_n}{T_n}\right)}{CL_n^2},$$

where $M_i$ represents a match score, $L_n$ represents the predetermined number of minutiae comprising the corresponding latent print, $T_n$ represents the number of predetermined minutiae comprising the corresponding print in the tenprint and C comprises $$\left(M_i \frac{\max(\square_{unweighted})}{\max(\square_{weighted})}\right)^{-1},$$

where $M_i$ represents the match score, $\square_{unweighted}$ represents a maximum unweighted match score from the first ordered list, and $\square_{weighted}$ represents a maximum weighted match score from the second ordered list.

10. The method for fingerprint matching according to claim 7, wherein said weighting factor is approximated by at least one of a series expansion, a Taylor expansion, an Euler expansion and an expansion of sines and cosines.

11. Apparatus for fingerprint matching, comprising:
   a processor element programmable for performing a method for fingerprint matching
   a memory element for storing processor readable code for programming the processor element to perform a method for fingerprint matching comprising the steps of:
      generating a set of search prints comprising a plurality of latent prints each having an unknown identity and each comprising a predetermined number of minutiae and a tenprint file print comprising a plurality of prints each having a known identity and each comprising a predetermined number of minutiae;
      comparing the minutiae of the latent prints in the set of search prints to the minutiae of the prints in the tenprint;
      generating a first ordered list of match scores based on the comparison, wherein each match score indicates how closely a given latent print in the set of search prints matches a given print in the tenprint; and
      generating a second ordered list of match scores by modifying each match score in the first ordered list based at least on the predetermined number of minutiae comprising the corresponding latent print.

12. The apparatus of claim 11, the processor readable code further for generating the second ordered list by modifying each match score in the first ordered list by a weighting factor that is based on the predetermined number of minutiae comprising the corresponding print in the tenprint and the predetermined number of minutiae comprising the corresponding latent print.

13. The apparatus of claim 11, wherein the apparatus is included in an Automatic Fingerprint Identification System (AFIS).

14. The apparatus of claim 11, the processor readable code further for generating a third ordered list of match scores by modifying each match score in the second ordered list based at least on a maximum score value in the first ordered list of match scores.

15. A computer-readable storage element having computer readable code stored thereon for programming a computer to perform a method for fingerprint matching comprising the stops of:
   generating a set of search prints comprising a plurality of latent prints each having an unknown identity and each comprising a predetermined number of minutiae and a tenprint file print comprising a plurality of prints each having a known identity and each comprising a predetermined number of minutiae;
   comparing the minutiae of the latent prints in the set of search prints to the minutiae of the prints in the tenprint;
   generating a first ordered list of match scores based on the comparison, wherein each match score indicates how closely a given latent print in the set of search prints matches a given print in the tenprint;
   generating a second ordered list of match scores by modifying each match score in the first ordered list based at least on the predetermined number of minutiae comprising the corresponding latent print and the predetermined number of minutiae comprising the corresponding file print in the tenprint; and
   generating a third ordered list of match scores by modifying each match score in the second ordered list based at least on a maximum match score in the first ordered list.

16. The computer-readable storage medium of claim 15 further programming the computer for generating the second ordered list by modifying each match score in the first ordered list by a weighting factor that is based on a ratio of the predetermined number of minutiae comprising the corresponding print in the tenprint and the predetermined number of minutiae comprising the corresponding latent print.

17. The computer-readable storage medium of claim 15, wherein the computer-readable storage medium comprises at least one at a hard disk, a CD-ROM, an optical storage device and a magnetic storage device.

* * * * *

UNITED STATES PATENT AND TRADEMARK OFFICE
CERTIFICATE OF CORRECTION

PATENT NO. : 7,099,498 B2
APPLICATION NO. : 10/261790
DATED : August 29, 2006
INVENTOR(S) : Lo It is certified that error appears in the above-identified patent and that said Letters Patent is hereby corrected as shown below:

In the specification, column 5, lines 40-45, change the formula to:

$$\hat{\Theta} = \frac{S_i^3 \exp\left(\dfrac{L_n}{T_n}\right)}{CL_n^2}$$

In the specification, column 5, line 51, change "feast" to --least--

In claim 5, line 33, delete "of"
In claim 6, line 47, add the word --and-- before "$T_n$"
In claim 11, change "matching" to --matching;--
In claim 16, add the word --for-- after the word "further"

Signed and Sealed this

Fifteenth Day of May, 2007

JON W. DUDAS
*Director of the United States Patent and Trademark Office*